United States Patent
Massie et al.

(10) Patent No.: US 11,756,043 B1
(45) Date of Patent: Sep. 12, 2023

(54) PAYMENT CARD EXPIRATION IDENTIFICATION AND INFORMATION UPDATE

(71) Applicant: UIPCO, LLC, San Antonio, TX (US)

(72) Inventors: Robert Andrew Massie, San Antonio, TX (US); Brian Francisco Shipley, Plano, TX (US); Priyadarshini Badugu, Frisco, TX (US); Timothy Chalmers, San Antonio, TX (US); Robert Lee Black, San Antonio, TX (US); David Joaquin Harris, San Antonio, TX (US); Christopher Flores, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 30 days.

(21) Appl. No.: 17/184,957

(22) Filed: Feb. 25, 2021

Related U.S. Application Data

(60) Provisional application No. 62/982,479, filed on Feb. 27, 2020.

(51) Int. Cl.
 *G06Q 20/40* (2012.01)
 *G06Q 20/32* (2012.01)
 *G06Q 20/38* (2012.01)

(52) U.S. Cl.
 CPC ......... *G06Q 20/409* (2013.01); *G06Q 20/326* (2020.05); *G06Q 20/3821* (2013.01); *G06Q 20/4018* (2013.01)

(58) Field of Classification Search
 CPC ........... G06Q 40/00–02; G06Q 20/401; G06Q 20/4018; G06Q 20/42; G06Q 20/409
 See application file for complete search history.

(56) References Cited

U.S. PATENT DOCUMENTS

| | | | |
|---|---|---|---|
| 9,947,007 B2 * | 4/2018 | Greenbaum | G06Q 20/00 |
| 10,936,565 B2 * | 3/2021 | Groarke | G06F 16/22 |
| 2006/0131385 A1 * | 6/2006 | Kim | G06Q 20/425 |
| | | | 235/379 |
| 2008/0040276 A1 * | 2/2008 | Hammad | G06Q 20/385 |
| | | | 705/44 |
| 2009/0171839 A1 * | 7/2009 | Rosano | G06Q 20/403 |
| | | | 705/40 |
| 2010/0299230 A1 * | 11/2010 | Patterson | G06Q 20/10 |
| | | | 705/30 |
| 2010/0299254 A1 * | 11/2010 | Patterson | G06Q 20/10 |
| | | | 705/40 |

(Continued)

OTHER PUBLICATIONS

Anonymous, Easy Billing Change System, IP.com Prior Art Database Technical Disclosure, Nov. 6, 2008. (Year: 2008).*

*Primary Examiner* — Eric T Wong
(74) *Attorney, Agent, or Firm* — Potomac Law Group, PLLC

(57) ABSTRACT

A system to identify and update expired payment cards may include servers that can perform operations including determining that a transaction performed with first payment card is denied due to expiration of the first payment card, determining that the expired first payment card is replaced with a second payment card, and sending information associated with the second payment card to a merchant payment server for performing the transaction.

20 Claims, 6 Drawing Sheets

(56) References Cited

U.S. PATENT DOCUMENTS

| | | | | |
|---|---|---|---|---|
| 2014/0032409 A1* | 1/2014 | Rosano | ............... | G06Q 20/401 |
| | | | | 705/44 |
| 2014/0258099 A1* | 9/2014 | Rosano | ............... | G06Q 20/409 |
| | | | | 705/39 |
| 2014/0279534 A1* | 9/2014 | Miles | ................ | G06Q 20/4016 |
| | | | | 705/44 |
| 2017/0116585 A1* | 4/2017 | Rosano | .................. | G06Q 40/12 |
| 2018/0130062 A1* | 5/2018 | O'Donnell | ............ | G06Q 20/20 |
| 2018/0174211 A1* | 6/2018 | Senci | ..................... | G06Q 20/12 |
| 2019/0114633 A1* | 4/2019 | Gandhi | ............... | G06Q 20/385 |
| 2019/0384896 A1* | 12/2019 | Jones | .................... | G06F 21/602 |
| 2021/0117968 A1* | 4/2021 | Bhasin | .................. | G06Q 20/20 |

\* cited by examiner

PAYMENT CARD EXPIRATION IDENTIFICATION AND INFORMATION UPDATE

CROSS-REFERENCE TO RELATED APPLICATION(S)

This application is a non-provisional of and claims priority to U.S. Provisional Application No. 62/982,479, filed on Feb. 27, 2020, entitled "PAYMENT CARD EXPIRATION IDENTIFICATION AND INFORMATION UPDATE," which is hereby incorporated by reference in its entirety for all purposes.

TECHNICAL FIELD

This disclosure is directed generally to systems, methods, and apparatuses for determining expiration of payment card and updating an expired payment card.

BACKGROUND

Shopping for a service using the Internet involves a familiar process of signing up for the service and providing credit card information so that a merchant can periodically charge a customer for using the service. For example, if a customer wants to use his or her credit card to pay for a monthly bill for utilities, then the customer can go to the utility provider's website and sign up to enable the utility provider to charge a monthly amount to the customer's credit card. In another example, a customer may sign up for a yearly subscription for an online shopping or entertainment service where the customer pays once a year every year for the subscription. A service provider's website can enable customers to easily sign up for recurring payments.

Figure 1:
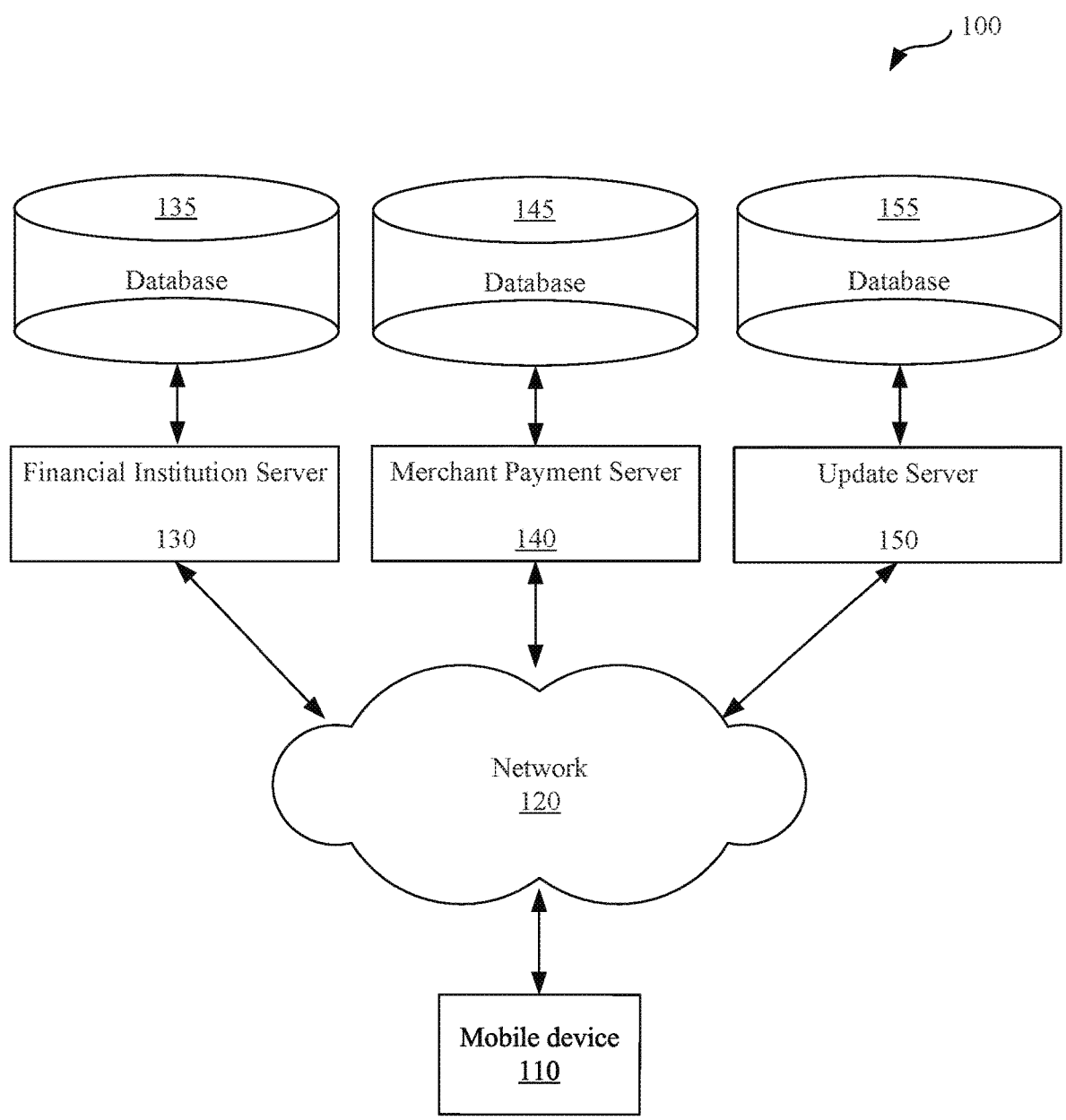
FIG. 1 shows an example system to identify and update expired payment cards.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Payment cards such as credit cards are often associated with expiration dates partly because payment cards may physically or electronically deteriorate over time and partly to minimize fraudulent use of payment cards. When a payment card expires, businesses that charge customers on a periodic basis may not be able to perform transactions using the expired payment card, resulting in suspension or cancelation of a service or product. Thus, one of the technical problems with conventional payment technology is that payment servers operated by merchants may not be able to perform recurring transactions once payment cards expire. Another technical problem with conventional payment technology is that systems are not setup to enable payment servers to request and receive updated payment card information for those payment cards that have expired. This patent document describes example systems, methods, and apparatuses that overcome at least the technical problems described above for conventional payment technology.

FIG. 1 shows an example system to identify and update expired payment cards. The system 100 includes three servers 130, 140, 150 that can communicate with each other over a network 120 (e.g., the Internet). The financial institution server 130 can authorize transactions requested by the merchant payment server 140. For a transaction, the merchant payment server 140 may provide payment card related information to the financial institution server 130 whereupon the financial institution server 130 can determine whether the payment card related information is stored on a database 135 and whether the payment card has expired. Payment card related information may include a unique number assigned to a payment card (e.g., credit card number), a security code (e.g., a card verification value (CVV)), and an expiration date of the payment card. If the received payment card related information is also stored on the database 135 and if the payment card has not yet expired, then the financial institution server 130 may authorize the transaction requested by the merchant payment server 140.

The system can include an update server 150 that can store on a database 155 two lists of payment card related information. A first list may include payment card related information for currently issued payment cards and for expired payment cards, and a second list may include payment card related information for new payment cards that replace the expired payment card from the list. Each payment card related information on the second list may be associated with an expired payment card related information from the first list. An example of a database is shown in Table 1 below.

TABLE 1

| First List | | | Second List | | |
|---|---|---|---|---|---|
| Card No. | CVV | Expiration Date | Card No. | CVV | Expiration Date |
| 1234 4567 7890 1200 | 526 | 20 Jan. 2022 | 2144 5648 1512 4522 | 120 | 20 Jun. 2025 |
| 5216 8564 2356 8562 | 265 | 20 Aug. 2023 | | | |
| . . . | | | | | |

As shown in Table 1, assuming that the first payment card shown in the first list (i.e., card no. 1234 4567 7890 1200) has expired, then the updated payment card information can be stored on the second list and associated with the expired payment card from the first list. For ease of explanation, the two payment cards (i.e., card nos. 1234 4567 7890 1200 and 2144 5648 1512 4522) are shown on the same row to indicate that they are related. However, other database techniques can be employed to associate the expired payment card and its related updated payment card. In Table 1, the second payment card on the first list (i.e., card no. 5216 8564 2356 8562) is shown to be currently issued and not yet expired, and thus does not have an updated payment card information in the second list. The update server 150 may be a third-party server or alternatively can be associated with a payment card issuer.

The system 100 also includes a mobile device 110 (e.g., smartphone, laptop, desktop) that can communicate with a merchant payment server 140 over the network 120. For example, the mobile device 110 can sign up for recurring payment via a website hosted on the merchant payment server 140 so that the merchant payment server 140 can perform periodic transactions with the financial institution server 130 to collect recurring payments. The merchant payment server 140 may store on its database 145 the payment card related information for recurring payment and the frequency (e.g., 15th day of every month, or first of January every year, etc.,) with which the payment cards can be charged. For ease of explanation, this patent document describes an example system with a single merchant payment server. In some embodiments, the disclosed system can be used with multiple merchant payment servers in communication with the financial institution server 130, the update server 150, and/or multiple mobile devices.

The operations performed by and the flow of data between financial institution server 130, the merchant payment server 140, and the update server 150 is not well-understood or conventional at least because application programming interfaces (APIs) associated with the modules of the three servers (as further described below) have not been developed to address at least some of the technical problems described in this patent document. The operations performed by the financial institution server 130, the merchant payment server 140, and the update server 150 are further described in FIG. 2.

Figure 2:
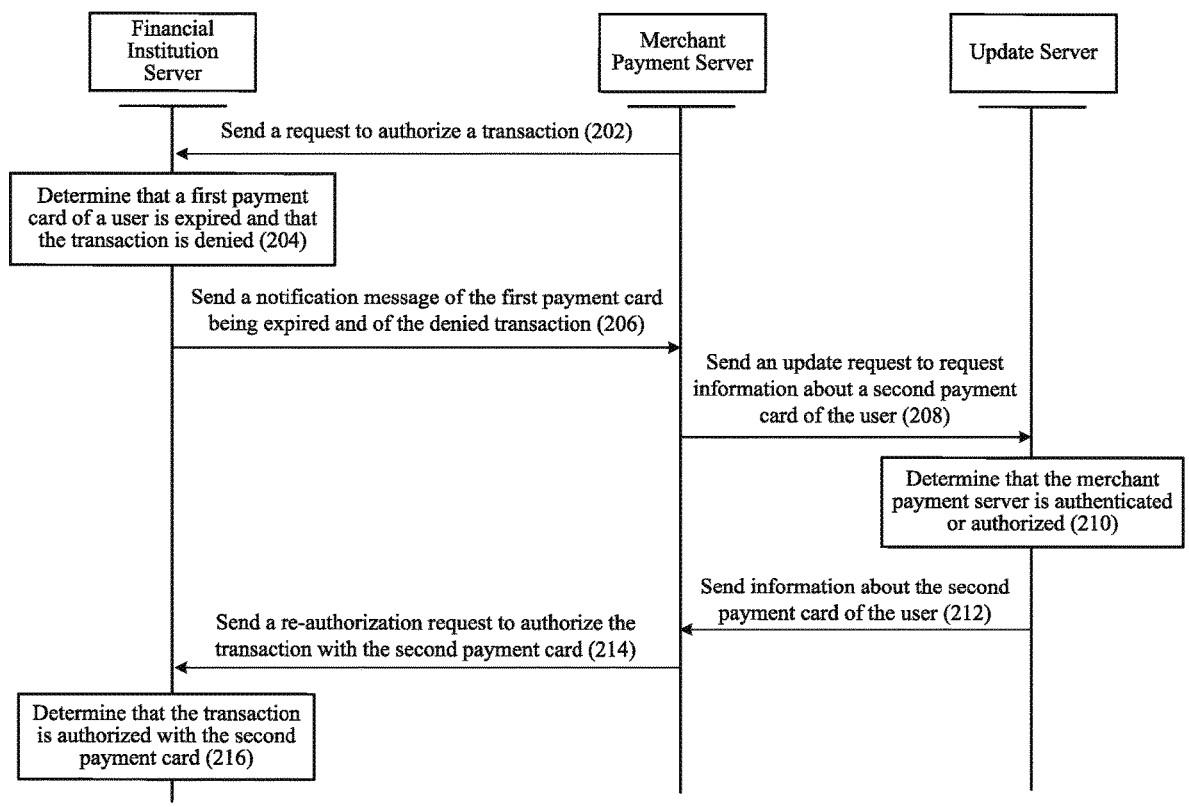
FIG. 2 shows a flow chart of operations performed by a financial institution server, a merchant payment server, and an update server.

FIG. 2 shows a flow chart of operations performed by a financial institution server, a merchant payment server, and an update server. At operation 202, an authorization request module of the merchant payment server (shown as 352 in FIG. 3B) may initiate the process to authorize a transaction for a service (e.g., paying monthly utility bill or a subscription for a service). The authorization request module sends a request to authorize a transaction, where the request may be a message (e.g., in an Internet Protocol (IP) packet) that includes one or more unique identifiers of a first payment card associated with a user, where the first payment card is used to perform the transaction. A payment card may be a physical payment card (e.g., a physical credit card) or an electronic payment card (e.g., electronic credit card) stored on a user's mobile device (e.g., 110 in FIG. 1). The one or more unique identifiers of a first payment card may include a first credit card number, a first debit card number, and/or a first card verification value (CVV). In some cases, the transaction for which the merchant payment server initiated operation 202 (or operation 214 described below) may be considered a transaction that is part of recurring transactions performed at a pre-determined interval (e.g., monthly, yearly, etc.,).

At operation 204, a transaction authorization module of the financial institution server (shown as 342 in FIG. 3A) receives the request message comprising the one or more unique identifiers and determines, based on the one or more unique identifiers, that the first payment card is expired that that the transaction is denied. The transaction authorization module can obtain one or more unique identifiers for a first payment card determine whether to approve or deny a transaction using well-known techniques. For example, the transaction authorization module can compare the unique identifier(s) to information associated with the first payment card stored in a database (e.g., 135 in FIG. 1) associated with the financial institution server. Based on the information stored on the database and based on the identifier(s) of a payment card, the transaction authorization server can determine whether a payment card is authorized or not authorized to perform a requested transaction.

At operation 206, a notification module of the financial institution server (shown as 344 in FIG. 3A) may generate and send a notification message to the merchant payment server. The notification message may be included in an IP packet and may include content that indicates that the first payment card is expired and that the transaction is denied.

Figure 3A:
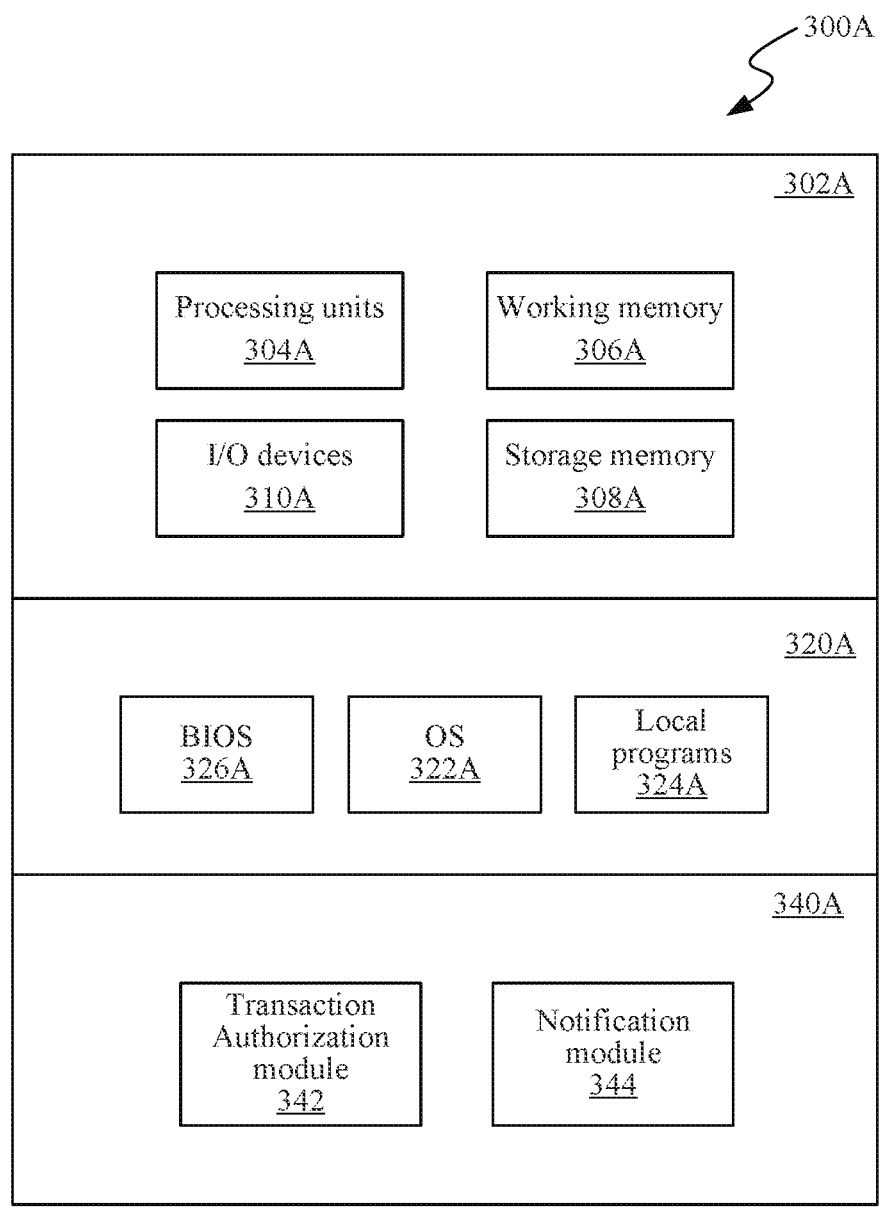
FIGS. 3A-3C are block diagrams illustrating an overview of devices on which some implementations of the disclosed technology can operate.
Figure 3B:
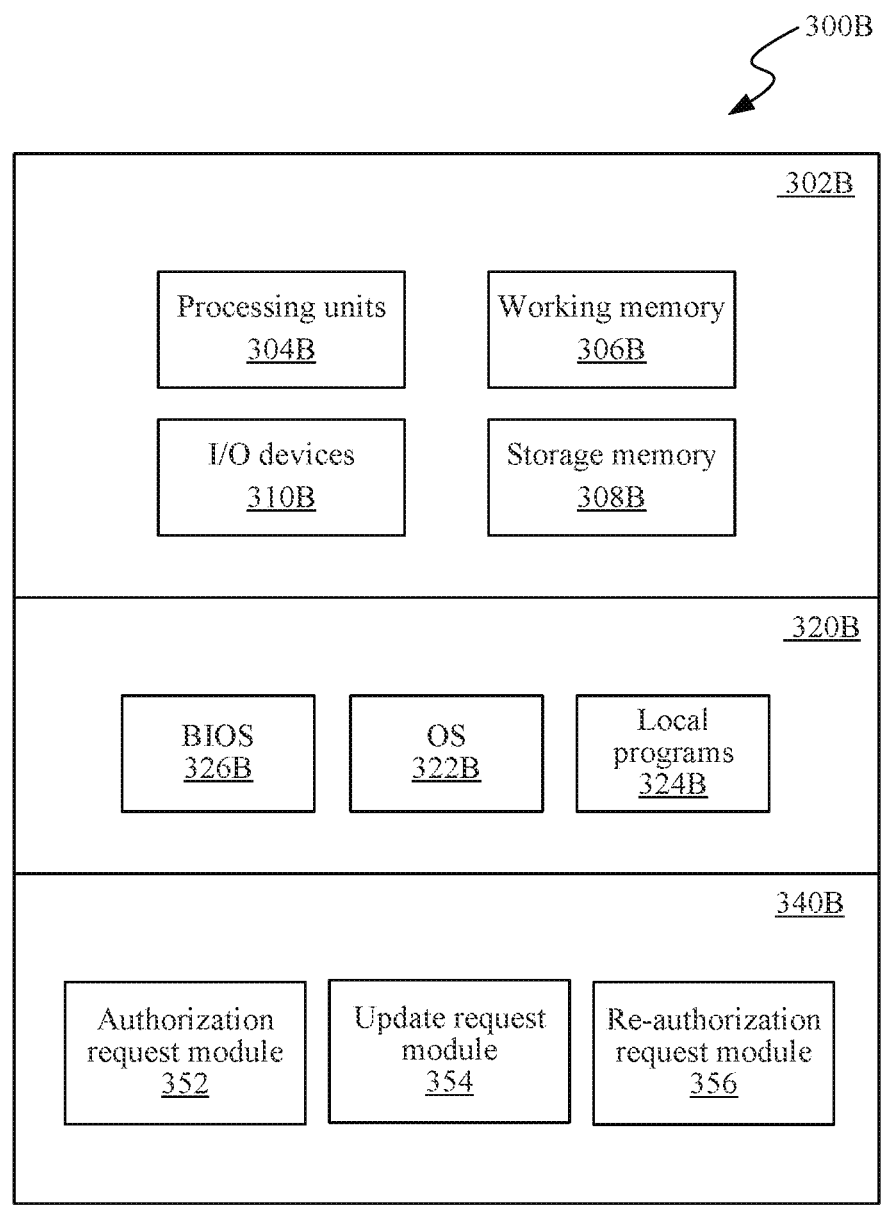

At operation 208, the authorization request module of the merchant payment server receive the notification message, determines that the transaction has been denied due to an expired first payment card, and sends the notification message to the update request module of the merchant payment server (shown as 354 in FIG. 3B). Operation 208 also includes the update request module generating and sending an update request message to the update server to request information about a second payment card of the user, where the second payment card replaces the expired first payment card. The update request module may be triggered to generate and sent the update request message after the notification message is received by the authorization request module. The generated update request message may include one or more unique identifiers of the first payment card so that the update server can determine information about the second payment card that replaced the expired first payment card. The update request message may also include a unique token associated with the merchant payment server so that the update server can authorized and/or authenticate the merchant payment server as further explained below.

At operation 210, the authorization or authentication module of the update server (shown as 362 in FIG. 3C) receives the update request message and performs operations to determine whether the merchant payment server is authorized and/or authenticated based on the unique token included in the update request message.

In a first example embodiment, the unique token may be a unique encrypted alphanumeric value. In such an example embodiment, the update request module of the merchant payment server may generate the encrypted alphanumeric value using a private encryption key on a unique value (e.g., an alphanumeric code) provided to the merchant payment server and to the update server by the financial institution server. The authorization or authentication module can use a stored public key associated with the merchant payment server to decrypt the encrypted alphanumeric value to obtain the unique value. After decryption, the authorization or authentication module determines that the merchant payment server is authenticated if the unique value obtained from the update request message is the same as the unique value provided to the update server from the financial institution server.

In a second example embodiment, the unique token may be a login and/or password. In such an example embodiment, the update request module of the merchant payment server may send the login and/or password provided to the merchant payment server and to the update server by the financial institution server. The login and/or password is unique for each merchant payment server in a system where multiple merchant payment servers are used. The update server may store the login and/or password for each of one or more merchant payment servers in a database associated with the update server (e.g., 155 in FIG. 1). The authorization or authentication module can compare the received login and/or password to the login and/or password stored in the update server's database. The authorization or authentication module determines that the merchant payment server is authorized to request the second payment card if the login and/or password from the update request message is the same as the login and/or password provided to the update server from the financial institution server. In some other embodiments, the unique token can be an encrypted alphanumeric value that may include a username and a password so that the authorization or authentication module can perform authentication and authorization techniques described above in the first and the second example embodiments.

At operation 212, after the authorization or authentication module determines that the merchant payment server is authorized, the authorization or authentication module obtains information about a second payment card and sends the second payment card related information to the merchant payment server. The information of the second payment card may include one or more updated unique identifiers of the second payment card, where the updated unique identifier(s) may include a second credit card number, a second debit card number, and/or a second CVV.

The authorization or authentication module can obtain information about the second payment card in one of several ways. In one example embodiment, the information of the second payment card may be stored on a database of the update server as shown in the Table 1. The authorization or authentication module can obtain the second payment card related information by searching the database to identify the updated payment card information associated with one or more unique identifiers of an expired payment card.

In another example embodiment, the authorization or authentication module can send a request to a mobile device of the user to determine whether the information of the second payment card can be sent to the merchant payment server. In this embodiment, before the authorization or authentication module sends the one or more updated unique identifiers of the second payment card to the merchant payment server, the authorization or authentication module can send to a mobile device of a user an alert message (e.g., a text message or a message in an application operating on the mobile device). The alert message is displayed on the mobile device and includes a prompt (e.g., a "yes" or "no" button on a graphical user interface (GUI)) that enables the user to, via the mobile device, authorize the update server to send the information of the second payment card to the merchant payment server. For example, if the user selects the "yes" button, then the mobile device can send an authorization message to the update server indicating that the authorization or authentication module of the update server is authorized to send to the merchant payment server the second payment card's information (e.g., the updated unique identifier(s)) that may be stored on the update server's database.

In yet another example embodiment, the authorization or authentication module can send a request to a mobile device of the user to enable the user to provide the second payment card related information to the update server so that the update server can send this information to the merchant payment server. In this embodiment, before the authorization or authentication module sends the one or more updated unique identifiers of the second payment card to the merchant payment server, the authorization or authentication module can send to a mobile device of a user an alert message (e.g., a text message or a message in an application operating on the mobile device). The alert message is displayed on the mobile device and includes a prompt (e.g., one or more fields to be entered by a user or a button to "take picture" of updated payment card) that enables the user to, via the mobile device, enter information about the second payment card. For example, the user can use the one or more fields provided by the prompt to enter the updated card number, updated CVV, and/or expiration date of the second payment card. In another example, the user can take a picture of the second payment card and the mobile device can perform standard image processing techniques to derive the updated card number, updated CVV, and/or expiration date of the second payment card from the image of the second payment card. The mobile device can send to the update server an update message that includes the entered or obtained updated information of the second payment card whereupon the authorization or authentication module of the update server can send to the merchant payment server the second payment card's information (e.g., the updated unique identifier(s)).

The re-authorization request module of the merchant payment server (shown as 356 in FIG. 3B) receives the information for the second payment card associated with the user and generates another request message to perform the transaction for the service referred to in operation 202. At operation 214, the re-authorization request module can send the re-authorization request to authorize the transaction with the second payment card. The re-authorization request may include one or more updated unique identifiers associated with a second payment card. At operation 216, the transaction authorization module of the financial institution server determines that the transaction for the service is authorized based on the one or more updated unique identifiers of the second payment card. In some embodiments, the transaction authorization module can send to the merchant payment server a confirmation message that indicates that the transaction is approved or authorized.

FIG. 3A is a block diagram illustrating components 300A which, in some implementations, can be used in a financial institution server employing the technology described in this patent document. The components 300A include hardware 302A, general software 320A, and specialized components 340A. As discussed above, a financial institution server implementing the disclosed technology can use various hardware, including processing units 304A (e.g., CPUs, GPUs, APUs, etc.), working memory 306A, storage memory 308A, and input and output devices 310A. For example, a memory may store instructions that upon execution by the processing units 304A configure the financial institution server to perform the operations described in FIGS. 2 and 4 and/or in the various embodiments described in this patent document.

General software 320A can include various applications, including an operating system 322A, local programs 324A, and a basic input output system (BIOS) 326A. Specialized components 340A can be subcomponents of a general software application 320A, such as local programs 324A. Specialized components 340A can include any one or more of a transaction authorization module 342 and a notification module 344 as described in this patent document.

FIG. 3B is a block diagram illustrating components 300B which, in some implementations, can be used in a merchant payment server employing the technology described in this patent document. The components 300B include hardware 302B, general software 320B, and specialized components 340B. As discussed above, a merchant payment server implementing the disclosed technology can use various hardware, including processing units 304B (e.g., CPUs, GPUs, APUs, etc.), working memory 306B, storage memory 308B, and input and output devices 310B. For example, a memory may store instructions that upon execution by the processing units 304B configure the merchant payment server to perform the operations described in FIGS. 2 and 4 and/or in the various embodiments described in this patent document.

General software 320B can include various applications, including an operating system 322B, local programs 324B, and a basic input output system (BIOS) 326B. Specialized components 340B can be subcomponents of a general software application 320B, such as local programs 324B. Specialized components 340B can include any one or more of an authorization request module 352, an update request module 354 and a re-authorization request module 356 as described in this patent document.

Figure 3C:
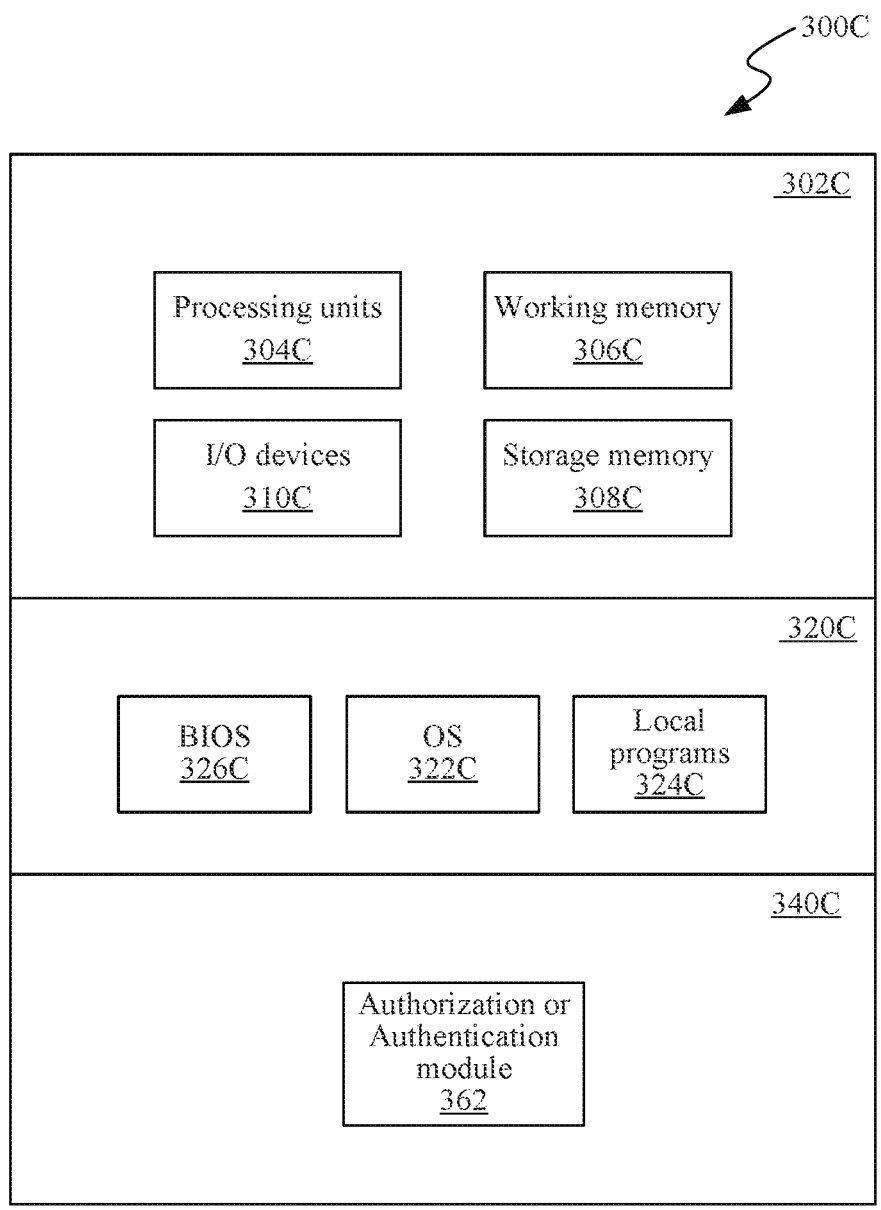

FIG. 3C is a block diagram illustrating components 300C which, in some implementations, can be used in an update server employing the technology described in this patent document. The components 300C include hardware 302C, general software 320C, and specialized components 340C. As discussed above, a financial institution server implementing the disclosed technology can use various hardware, including processing units 304C (e.g., CPUs, GPUs, APUs, etc.), working memory 306C, storage memory 308C, and input and output devices 310C. For example, a memory may store instructions that upon execution by the processing units 304C configure the update server to perform the operations described in FIGS. 2 and 4 and/or in the various embodiments described in this patent document.

General software 320C can include various applications, including an operating system 322C, local programs 324C, and a basic input output system (BIOS) 326C. Specialized components 340C can be subcomponents of a general software application 320C, such as local programs 324C. Specialized components 340C can include an authorization or authentication module 362 as described in this patent document.

Each of the modules described in FIGS. 3A-3C can include an application programming interface (API) with which a module can send and receive information to another module or to another server.

Figure 4:
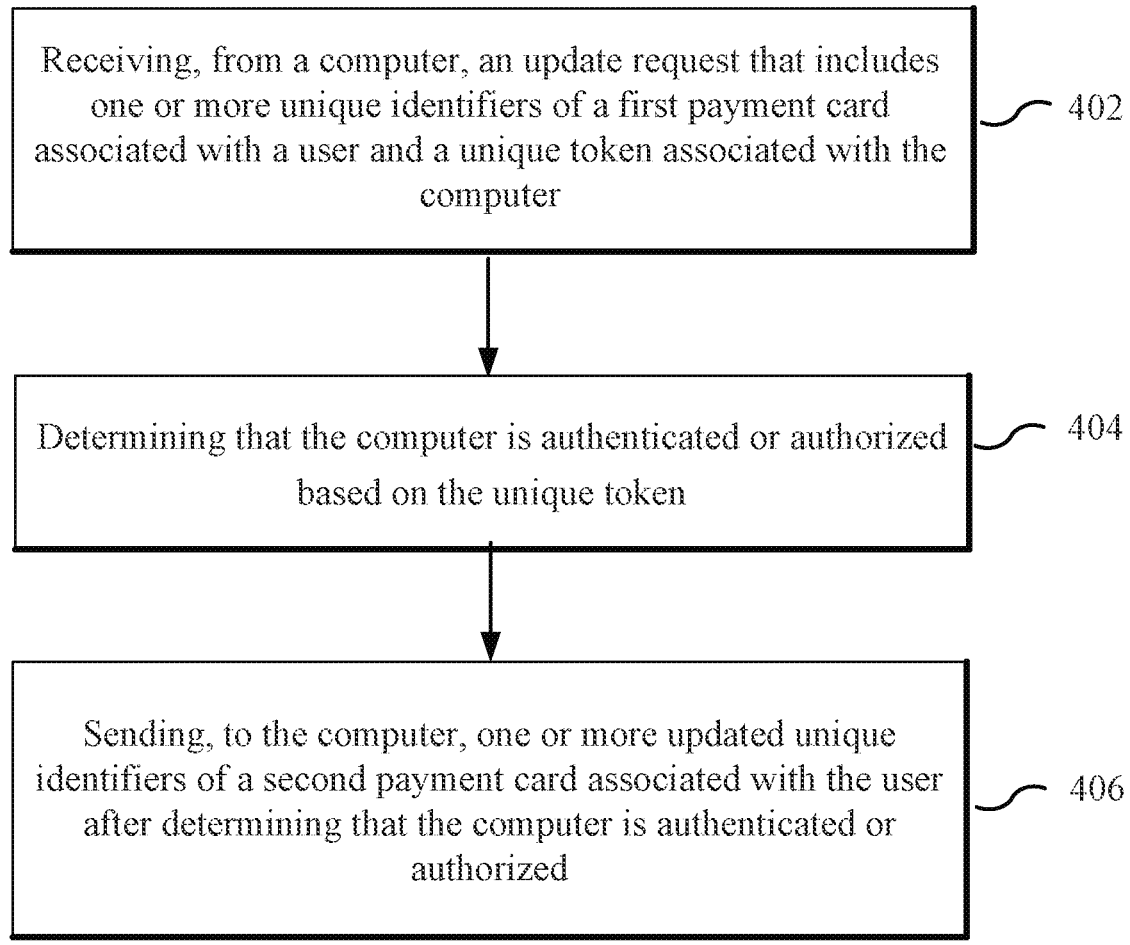
FIG. 4 shows an exemplary flow diagram to update expired payment cards.

FIG. 4 shows a flow diagram to update expired payment cards. At operation 402, the authorization or authentication module receives, from a computer (e.g., the merchant payment server), an update request that includes one or more unique identifiers of a first payment card associated with a user and a unique token associated with the computer. The update request is received after a transaction performed with the first payment card is denied. At operation 404, the authorization or authentication module determines that the computer is authenticated or authorized based on the unique token. At operation 406, the authorization or authentication module sends, to the computer, one or more updated unique identifiers of a second payment card associated with the user after determining that the computer is authenticated or authorized. After the one or more updated unique identifiers is sent, the transaction performed with the second payment card is authorized. Operations 402 to 406 can be performed by the update server and the determinations of whether a transaction is authorized or denied can be performed by the financial institution server as described int his patent document.

In some embodiments, before the one or more updated unique identifiers is sent to the computer, the method of FIG. 4 further comprises sending, to a mobile device associated with the user, an alert message to be displayed on the mobile device, where the alert message includes a prompt to enable an authorization of the sending of the one or more updated unique identifiers of the second payment card to the computer, and receiving, from the mobile device, an authorization message that indicates that the sending of the one or more updated unique identifiers of the second payment card to the computer is authorized, where the one or more updated unique identifiers of the second payment card are sent to the computer after the authorization message is received.

In some embodiments, before the updated unique identifier(s) is sent to the computer, the method of FIG. 4 further comprises sending, to a mobile device associated with the user, an alert message to be displayed on the mobile device, where the alert message includes a prompt that enables the updated unique identifier(s) of the second payment card to be entered via the mobile device, and receiving, from the mobile device, an update message that includes the updated unique identifier(s) of the second payment card, where the updated unique identifier(s) are sent to the computer after the update message is received.

In some embodiments, the unique token includes any one or more of an encrypted alphanumeric value, a username, and a password. In some embodiments, the transaction is a recurring transaction. In some embodiments, the one or more unique identifiers includes a first credit card number, a first debit card number, or a first card verification value (CVV), and the updated unique identifier(s) includes a second credit card number, a second debit card number, or a second CVV. In some embodiments, the first payment card and the second payment card are physical payment cards.

In some embodiments, a non-transitory computer-readable medium comprising computer-readable instructions for providing data protection is described. The computer-readable instructions comprising instructions that when executed by a processor causes the processor to implement a method described in FIGS. 1, 2, and 4, in the various embodiments in this patent document, and/or operations of the modules described in this patent document.

Those skilled in the art will appreciate that the components illustrated in FIGS. 2 and 4 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system for managing payment cards, comprising:
   a first computer, which is a financial institution computer at a financial institution entity, the financial institution computer comprising a processor, configured to:
   receive, from a second computer, which is a merchant payment computer at a merchant payment entity that is other than the financial institution entity, a request to authorize a transaction, wherein the request includes one or more unique identifiers of a first payment card associated with a user and used to perform the transaction;
   determine, based on the one or more unique identifiers of the first payment card, that the first payment card is expired and that the transaction is denied;
   send, to the second computer, a notification message that indicates that the first payment card is expired and that the transaction is denied;
   a third computer, which is an update computer at an update entity that is other than each of the financial institution entity and the merchant payment entity, the update computer comprising a processor and an update database for storing update payment card information, and wherein the third computer is configured to:
   receive, from the second computer, an update request that includes the one or more unique identifiers of the first payment card and a unique token associated with the second computer, wherein the second computer sends the update request after the notification message is received by the second computer;

determine that the second computer is authenticated or authorized based on the unique token;

determine, based on the information stored in the update database, whether the update database includes information of an updated second payment card associated with the first payment card;

send, to a mobile device, an alert message of the denied transaction associated with the user;

in response to sending the alert message of the denied transaction, receive, from the mobile device one or more updated unique identifiers of a second payment card;

send, to the second computer, the one or more updated unique identifiers of the second payment card associated with the user after determining that the second computer is authenticated or authorized;

the first computer being further configured to:

receive, from the second computer, a re-authorization request to re-authorize the transaction, wherein the re-authorization request includes the one or more updated unique identifiers associated with the second payment card sent from the third computer; and determine, based on the received one or more updated unique identifiers, that the transaction is authorized.

2. The system of claim 1, wherein before the one or more updated unique identifiers is sent to the second computer, the third computer is further configured to:

send, to the mobile device associated with the user, the alert message to be displayed on the mobile device, wherein the alert message includes a prompt that enables the third computer to be authorized to send information associated with the second payment card to the second computer; and receive, from the mobile device, an authorization message that indicates that the third computer is authorized to send information associated with the second payment card to the second computer, wherein the one or more updated unique identifiers of the second payment card are sent by the third computer to the second computer after the authorization message is received.

3. The system of claim 1, wherein before the one or more updated unique identifiers is sent by the third computer to the second computer, the third computer is further configured to:

send, to the mobile device associated with the user, the alert message to be displayed on the mobile device, wherein the alert message includes a prompt that enables the one or more updated unique identifiers of the second payment card to be entered via the mobile device.

4. The system of claim 1, wherein the unique token includes any one or more of an encrypted alphanumeric value, a username, and a password.

5. The system of claim 1, wherein the transaction is a recurring transaction.

6. The system of claim 1, wherein the one or more unique identifiers includes a first credit card number, a first debit card number, or a first card verification value (CVV), and wherein the one or more updated unique identifiers includes a second credit card number, a second debit card number, or a second CVV.

7. The system of claim 1, wherein the first payment card and the second payment card are physical payment cards.

8. A method of managing payment cards by an update computer at an update entity, the update computer including a processor and an update database for storing update payment card information, comprising:

receiving, from a merchant payment computer at a merchant entity that is other than the update entity, an update request that includes one or more unique identifiers of a first payment card associated with a user and a unique token associated with the merchant payment computer, wherein the update request indicates that a transaction performed by a financial institution computer at a financial institution entity that is other than each of the update entity and the merchant payment entity with the first payment card is denied;

determining that the merchant payment computer is authenticated or authorized based on the unique token;

determining, based on the information stored in the update database, whether the update database includes information of an updated second payment card associated with the first payment card;

sending an alert message of the denied transaction to a mobile device associated with the user;

in response to sending the alert message of the denied transaction, receiving, from the mobile device, one or more updated unique identifiers of a second payment card; and sending, to the merchant payment computer, the one or more updated unique identifiers of the second payment card associated with the user after determining that the merchant payment computer is authenticated or authorized, wherein the transaction performed with the second payment card is authorized.

9. The method of claim 8, wherein the alert message includes a displayable prompt requesting an authorization of the sending of the one or more updated unique identifiers of the second payment card to the merchant payment computer wherein, in response to sending the alert message to the mobile device, the method further comprises:

receiving, from the mobile device, an authorization message that indicates that the sending of the one or more updated unique identifiers of the second payment card to the merchant payment computer is authorized.

10. The method of claim 8, wherein the alert message includes a displayable prompt requesting that the one or more updated unique identifiers of the second payment card to-be entered via the mobile device.

11. The method of claim 8, wherein the unique token includes any one or more of an encrypted alphanumeric value, a username, and a password.

12. The method of claim 8, wherein the transaction is a recurring transaction.

13. The method of claim 8, wherein the one or more unique identifiers includes a first credit card number, first debit card number, or a first card verification value (CVV), and wherein the one or more updated unique identifiers includes a second credit card number, a second debit card number, or a second CVV.

14. The method of claim 8, wherein the first payment card and the second payment card are physical payment cards.

15. A non-transitory computer-readable medium comprising computer-readable instructions for providing data protection, said computer-readable instructions comprising instructions that when executed by a processor causes the processor to implement a method of managing payment cards by an update computer at an update entity, the update computer including a processor and an update database for storing update payment card information, comprising:

receiving, from a merchant payment computer at a merchant entity that is other than the update entity, an update request that includes one or more unique identifiers of a first payment card associated with a user and a unique token associated with the merchant payment computer,
        wherein the update request indicates that a transaction performed by a financial institution computer at a financial institution entity that is other than each of the update entity and the merchant payment entity with the first payment card is denied;
    determining that the merchant payment computer is authenticated or authorized based on the unique token;
    determining, based on the information stored in the update database, whether the update database includes information of an updated second payment card associated with the first payment card;
    sending an alert message of the denied transaction to a mobile device associated with the user;
    in response to sending the alert message of the denied transaction, receiving, from the mobile device, one or more updated unique identifiers of a second payment card; and
    sending, to the merchant payment computer, the one or more updated unique identifiers of the second payment card associated with the user after determining that the merchant payment computer is authenticated or authorized,
    wherein the transaction performed with the second payment card is authorized.

16. The non-transitory computer-readable medium of claim 15,
    wherein the alert message includes a displayable prompt requesting an authorization of the sending of the one or more updated unique identifiers of the second payment card to the merchant payment computer; and
    wherein, in response to sending the alert message to the mobile device, the method further comprises: receiving, from the mobile device, an authorization message that indicates that the sending of the one or more updated unique identifiers of the second payment card to the merchant payment computer is authorized.

17. The non-transitory computer-readable medium of claim 15,
    wherein the alert message includes a displayable prompt requesting that the one or more updated unique identifiers of the second payment card be entered via the mobile device.

18. The non-transitory computer-readable medium of claim 15, wherein the unique token includes any one or more of an encrypted alphanumeric value, a username, and a password.

19. The non-transitory computer-readable medium of claim 15, wherein the transaction is a recurring transaction.

20. The non-transitory computer-readable medium of claim 15,
    wherein the one or more unique identifiers includes a first credit card number, a first debit card number, or a first card verification value (CVV), and
    wherein the one or more updated unique identifiers includes a second credit card number, a second debit card number, or a second CVV.

* * * * *